No. 655,050. Patented July 31, 1900.
O. P. BROWN.
CUSHION TIRE.
(Application filed Mar. 17, 1900.)
(No Model.)
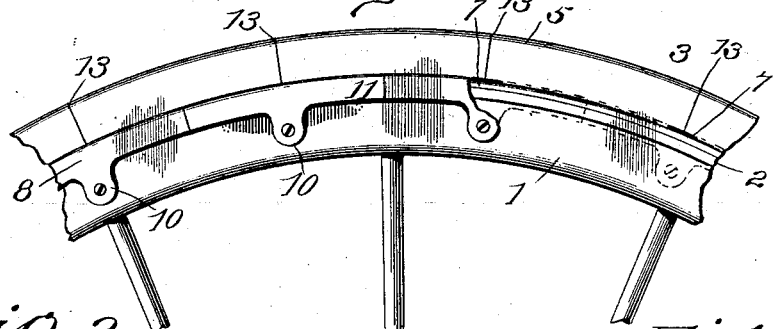
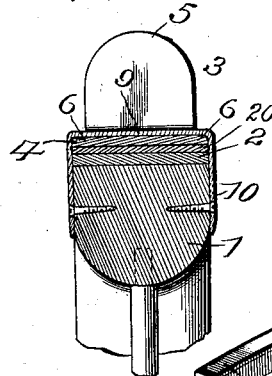
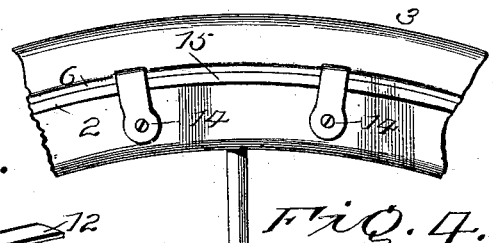
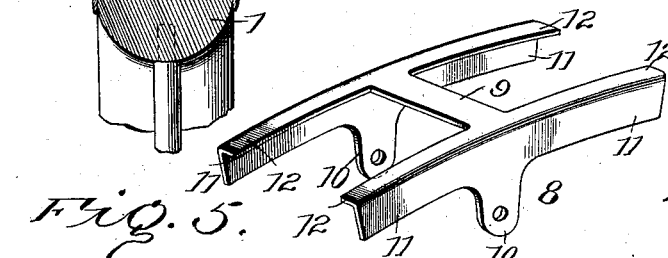
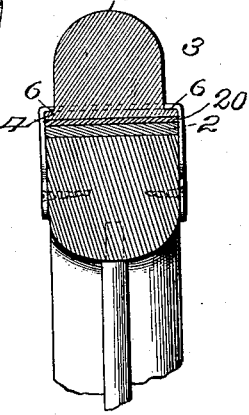
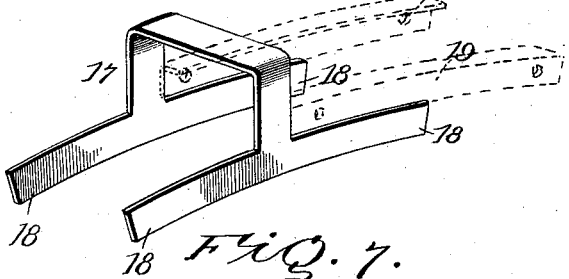
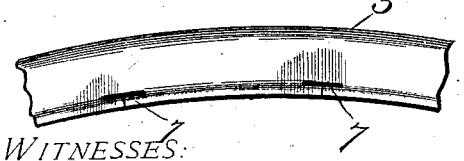
WITNESSES:
INVENTOR
Oscar P. Brown.
BY J. R. Nottingham
Attorney

UNITED STATES PATENT OFFICE.

OSCAR P. BROWN, OF PROVIDENCE, RHODE ISLAND, ASSIGNOR TO WEBBER G. KENDALL, OF SAME PLACE.

CUSHION-TIRE.

SPECIFICATION forming part of Letters Patent No. 655,050, dated July 31, 1900.

Application filed March 17, 1900. Serial No. 9,055. (No model.)

*To all whom it may concern:*

Be it known that I, OSCAR P. BROWN, a citizen of the United States, residing at Providence, in the county of Providence and State of Rhode Island, have invented certain new and useful Improvements in Cushion-Tires; and I do hereby declare the following to be a full, clear, and exact description of the invention, such as will enable others skilled in the art to which it appertains to make and use the same.

My invention relates to cushion-tires and the means by which they are attached to vehicle-wheels; and it consists, preferably, of a continuous-tread tire provided with transverse openings forming seats for the reception of attaching devices and vertical kerfs intersecting said openings, by means of which the attaching devices are enabled to be placed in their seats.

The invention further consists in the novel means employed to attach the cushion-tire to the wheel.

The principal object of the invention is to provide a simple and inexpensive form of elastic or cushion tire, which will possess the requisite "riding qualities" necessary for easy and comfortable travel over rough and uneven roads and at the same time be sufficiently durable to withstand the usual wear and tear to which it may be subjected.

Another object of the invention is to provide for a quick and ready attachment to the wheel or removal therefrom by inexperienced persons.

Other objects will become apparent upon further description of the invention.

In the accompanying drawings, Figure 1 is a side elevation of a portion of the wheel, showing my invention applied thereto in its preferred form; Fig. 2, a transverse section thereof; Fig. 3, a view similar to Fig. 1, showing a modification of my invention; Fig. 4, a transverse section of the modified tire; Fig. 5, a modified form of attaching device; Fig. 6, a perspective view of the preferred form of attaching device, and Figs. 7 and 8 modified forms of tires.

Referring to the several views, the numeral 1 indicates the felly, and 2 the metal tire, of a portion of an ordinary vehicle-wheel.

The numeral 3 indicates my improved cushion-tire, which consists of a flat base 4, provided with a tread or rim 5, of less width than the base, so that a flange 6 will be formed on each side thereof. At regular intervals the base of the tread or rim is provided with transverse openings 7, which form seats or bearings for the horizontal portions of the attaching devices, which preferably consist of clips or yokes 8. These yokes are preferably formed with a horizontal portion 9 and arms 10, having oppositely-extending branches 11, said branches being formed with flanges 12, adapted to engage the flanges 6 of the elastic tire. Each arm is provided with a perforation for the reception of a screw by means of which the clip or yoke is secured to the wheel.

In order to insert the clips or yokes into their seats, the tread or rim is provided with transverse vertical slits 13, which intersect the openings 7 at their center. To place the clips in their seat, the horizontal portion 9 is inserted edgewise into the slit and forced down to the opening 7. Then by giving the clip a slight turn it will be inserted in the opening. In order to prevent the slits from gaping or opening at their outer edges, the sections of tire, it being preferable to mold them in lengths of about two feet, may be molded approximately on the curve of the wheel. It will not, however, affect the riding qualities of the tire or its durability should the slits gape or open slightly.

In the modification shown in Figs. 3 and 4 the slits 13 are dispensed with, and each attaching device consists of a plain clip or yoke 14, of approximately uniform width. The clips 14 are preferably molded and vulcanized in the tire; but when so constructed the tire need not be molded in a curve. In this form of tire and attaching devices I prefer to use a slightly-curved plate having an inwardly-turned flange, which plate is secured to the faces of the felly between each clip or yoke by screws or nails with the flange engaging the flanges 6 of the rubber tire. By the use of the plates the clips or yokes may be placed farther apart, as the flanges serve to firmly hold those portions of the tire between the clips onto the wheel.

The modified form of attaching device shown in Fig. 5 consists of a clip or yoke 17, having the lower ends of its arms provided with oppositely-extended branches 18. These clips are held firmly in position to clamp the tire to the wheel by means of plates 19. (Shown in dotted lines.) These plates are similar in construction to the plates above mentioned, and their lower edges abut against the upper edges of the branches 18, with their flange engaging the side flange of the rubber tire, so that when secured to the respective faces of the wheel the clips will securely hold the tire onto the wheel aided by the flanges of the plates 19. Screws may be employed to further secure the clips firmly in position.

In each form of attaching device a smooth and continuous surface will be presented, so that all danger of injury to the arms of the clips will be prevented.

The inner periphery of the cushion-tire is lined with canvas 20 to prevent the abrasion of the rubber, and if found necessary the joints between the several sections of tire may be cemented together.

Having thus fully described my invention, what I claim as new, and desire to secure by Letters Patent, is—

1. An elastic or cushion tire, consisting of a base provided with a tread of less width than the base, said tire being provided with a series of transverse openings forming seats for independent tire-attaching devices, and with transverse vertical slits intersecting said openings, whereby the attaching devices may be guided and seated in their respective seats.

2. An elastic or cushion tire, consisting of a base and a tread, the latter being of less width than the former, said tire being provided with a series of transverse openings, independent tire-attaching devices seated in said openings, said attaching devices being provided with side flanges to engage the projecting sides of the base of the tire.

3. An elastic or cushion tire, consisting of a base provided with a tread of less width than the base, and said tread being provided with a series of transverse openings to form seats for attaching devices, and a series of clips or yokes having their arms provided with oppositely-extending branches formed with the upper flanges, said flanges being adapted to engage the side edges of the base of the tire.

4. The combination with the rim of a wheel, of an elastic tire consisting of a base provided with a tread of less width than the base, said tire being provided with a series of transverse openings to form seats for independent detaching devices, a lining of canvas secured to said base, and independent attaching devices provided with side flanges to engage the projecting sides of the base, whereby the tire is secured onto the wheel.

5. The combination with the rim of a wheel, of an elastic tire, consisting of a base and a tread, the tread being of less width than the base, said tire being provided with a series of transverse openings or seats intersected by slits, a canvas lining secured to said base, and independent attaching devices provided with side flanges, whereby the tire is secured onto the wheel.

In testimony whereof I affix my signature in the presence of two witnesses.

OSCAR P. BROWN.

Witnesses:
FRANK E. WATERMAN,
FRANK T. EASTON.